US008346914B2

(12) United States Patent
Vaidyanathan et al.

(10) Patent No.: US 8,346,914 B2
(45) Date of Patent: Jan. 1, 2013

(54) GENERATING A TRAINING DATA SET FOR A PATTERN-RECOGNITION MODEL FOR ELECTRONIC PROGNOSTICATION FOR A COMPUTER SYSTEM

(75) Inventors: Kalyanaraman Vaidyanathan, San Diego, CA (US); Kenny C. Gross, San Diego, CA (US); Michelle C. Murrett, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 483 days.

(21) Appl. No.: 12/339,961

(22) Filed: Dec. 19, 2008

(65) Prior Publication Data

US 2010/0161810 A1 Jun. 24, 2010

(51) Int. Cl.
*G06F 15/173* (2006.01)
(52) U.S. Cl. ........................ 709/224; 709/223
(58) Field of Classification Search ........... 709/223–224
See application file for complete search history.

(56) References Cited

U.S. PATENT DOCUMENTS

2004/0088406 A1* 5/2004 Corley et al. ................. 709/224
2005/0188263 A1* 8/2005 Gross et al. .................... 714/25
2005/0228878 A1* 10/2005 Anstey et al. ................ 709/224
2009/0031018 A1* 1/2009 Conkright et al. ............ 709/224
2009/0222549 A1* 9/2009 Gilbert et al. ................. 709/224
2009/0235267 A1* 9/2009 McKinney et al. ........... 718/104

* cited by examiner

*Primary Examiner* — Joshua Joo
(74) *Attorney, Agent, or Firm* — Park, Vaughan, Fleming & Dowler LLP

(57) ABSTRACT

One embodiment of the present invention provides a system that trains a pattern-recognition model for electronic prognostication for a computer system. First, the system monitors a performance parameter from a set of computer systems that includes at least two computer systems, wherein monitoring the performance parameter includes systematically monitoring and recording performance parameters in a set of performance parameters from computer systems in the set of computer systems, wherein the recording process keeps track of the temporal relationships between events in different performance parameters in the set of performance parameters. Next, the system generates a training data set based on the monitored performance parameter from the set of computer systems, wherein generating the training data set includes concatenating two or more time-series of the performance parameter from computer systems in the set of computer systems. Then, the system trains the pattern-recognition model using the training data set. Next, the system uses the pattern-recognition model to look for anomalies in performance parameters gathered during operation of a monitored computer system. The system then generates an alarm when the pattern-recognition model detects an anomaly in the performance parameters from the monitored computer system.

20 Claims, 7 Drawing Sheets
(4 of 7 Drawing Sheet(s) Filed in Color)

False alarms due to data going outside MSET training range

GENERATING A TRAINING DATA SET FOR A PATTERN-RECOGNITION MODEL FOR ELECTRONIC PROGNOSTICATION FOR A COMPUTER SYSTEM

BACKGROUND

1. Field

This disclosure is generally related to techniques for electronic prognostication for computer systems. More specifically, this disclosure is related to a method and an apparatus that generates a training data set for a pattern-recognition model for electronic prognostication for a computer system.

2. Related Art

Typically, in order to generate a pattern-recognition model for electronic prognostication for a computer system, the computer system undergoes a training phase during which one or more performance parameters from the computer system are monitored and the pattern-recognition model is trained. Usually, the training period lasts long enough to capture performance parameters from the full range of normal operation of the computer system. For example, a computer system may often have to be monitored not only on busy workdays, but also on weekends, during lulls in usage, and during routine idiosyncrasies such as network backups. As a result, a computer system may have to be monitored for 10 days or more to train a pattern-recognition model to accurately capture the full range of operation which the computer system may experience during its service life. However, during this long training period the pattern-recognition model is not used for electronic prognostication, leaving the computer system vulnerable to failure without warning. Additionally, long training periods can delay the deployment of new computer systems.

Hence, what is needed is a method and system that trains a pattern-recognition model for electronic prognostication for a computer system without the above-described problems.

SUMMARY

One embodiment of the present invention provides a system that trains a pattern-recognition model for electronic prognostication for a computer system. First, the system monitors a performance parameter from a set of computer systems that includes at least two computer systems, wherein monitoring the performance parameter includes systematically monitoring and recording performance parameters in a set of performance parameters from computer systems in the set of computer systems, wherein the recording process keeps track of the temporal relationships between events in different performance parameters in the set of performance parameters. Next, the system generates a training data set based on the monitored performance parameter from the set of computer systems, wherein generating the training data set includes concatenating two or more time-series of the performance parameter from computer systems in the set of computer systems. Then, the system trains the pattern-recognition model using the training data set. Next, the system uses the pattern-recognition model to look for anomalies in performance parameters gathered during normal operation of a monitored computer system. The system then generates an alarm when the pattern-recognition model detects an anomaly in the performance parameters from the monitored computer system.

In some embodiments, monitoring the performance parameter from the set of computer systems includes storing the monitored performance parameter in a black-box recorder.

In some embodiments, generating the training data set includes analytically resampling the performance parameter monitored from computer systems in the set of computer systems.

In some embodiments, the electronic prognostication for the computer system includes using a sequential probability ratio test (SPRT).

In some embodiments, the pattern-recognition model includes a nonlinear, nonparametric regression model.

In some embodiments, the pattern-recognition model uses a multivariate state estimation technique (MSET).

In some embodiments, the computer system that the pattern-recognition model provides electronic prognostication for is in the set of computer systems.

In some embodiments, the set of computer systems includes at least one hundred computer systems.

In some embodiments, monitoring the performance parameter from a first computer system in the set of computer systems occurs prior to monitoring the performance parameter from a second computer system in the set of computer systems.

BRIEF DESCRIPTION OF THE FIGURES

The patent or application file contains at least one drawing executed in color. Copies of this patent or patent application publication with color drawing(s) will be provided by the Office upon request and payment of the necessary fee.

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media now known or later developed that is capable of storing code and/or data for use by a computer system.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1:
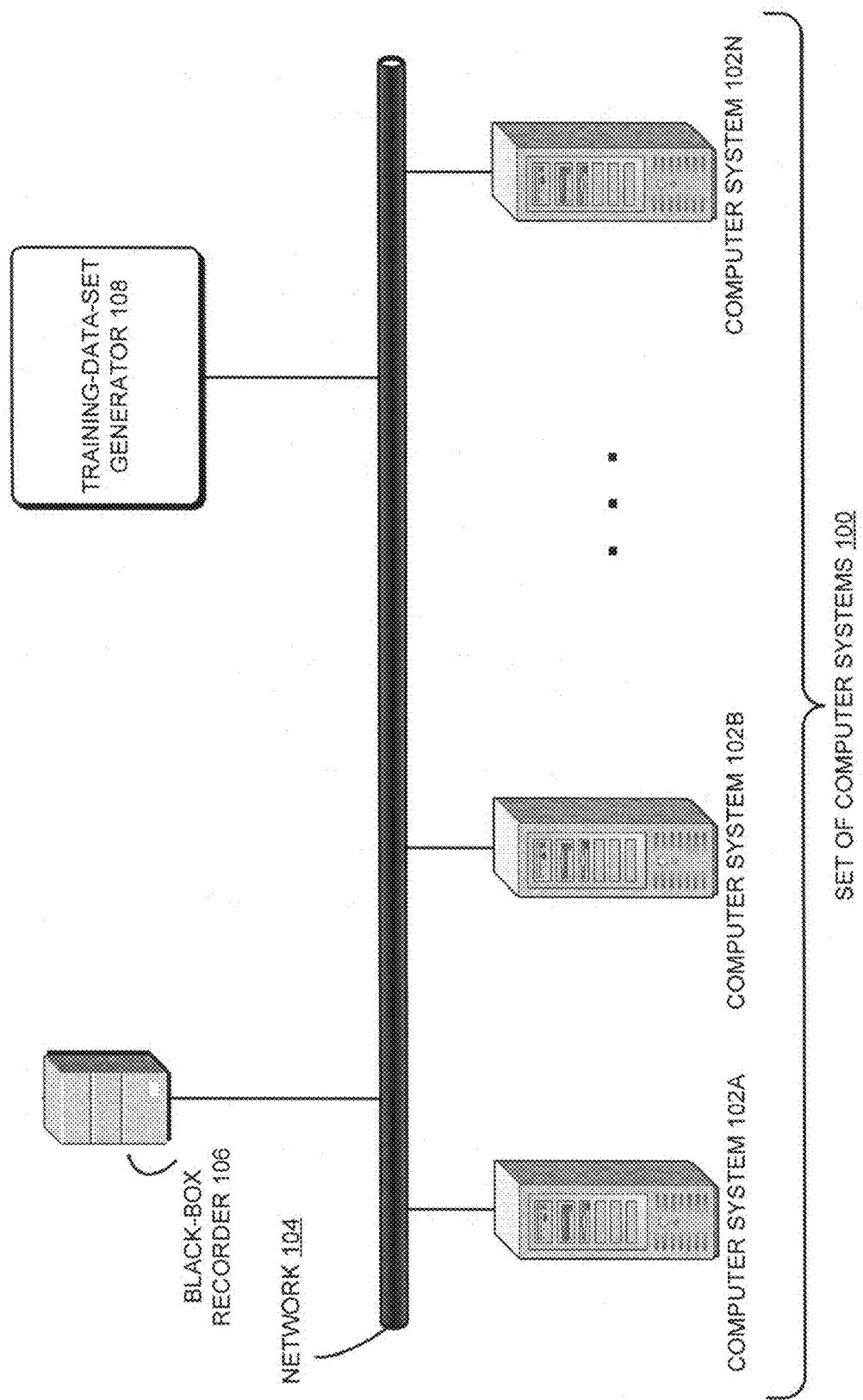
FIG. 1 illustrates a system that generates a training data set for a pattern-recognition model for electronic prognostication for a computer system in accordance with an embodiment.

FIG. 1 illustrates a system that generates a training data set for a pattern-recognition model for electronic prognostication for a computer system in accordance with an embodiment. Set of computer systems 100 includes N computer systems; for simplicity, only three of the N computer systems, computer system 102A, computer system 102B, and computer system 102N, are depicted. Additionally, computer systems in set of computer system 100 are coupled to network 104 along with black-box recorder 106 and training-data-set generator 108.

Each computer system in set of computer systems 100 can include but is not limited to a server, a server blade, a datacenter server, an enterprise computer, a field-replaceable unit that includes a processor, or any other computation system. In some embodiments, computer systems in set of computer systems 100 reside at different physical locations. Note that in some embodiments, set of computer systems 100 includes at least two computer systems.

Network 104 can include any system that allows computers to communicate with each other, including but not limited to any combination of one or more of the following computer networks: an intranet, an extranet, and/or the Internet. Note that any of the networks can include one or more wireless links.

Black-box recorder 106 can include any mechanism that can store information related to performance parameters from computer systems in set of computer systems 100. Black-box recorder 106 can be implemented in any combination of hardware and software. In some embodiments, black-box recorder 106 operates on a computer system such as a server. In other embodiments, black-box recorder 106 operates on one or more dedicated stand-alone processors, such as a service processor, located inside one or more computer systems in set of computer system 100. In some embodiments, black-box recorder 106 operates on a computer system in set of computer systems 100. In some embodiments, black-box recorder 106 is co-located with one or more computer systems in set of computer systems 100. In some embodiments, black-box recorder 106 is located separately from all computers in set of computer systems 100. In some embodiments black-box recorder 106 is located at a computer system vendor's data center.

In some embodiments, each computer system in set of computer systems 100 includes a performance-parameter monitor. A performance-parameter monitor can be implemented in any combination of hardware and software. In some embodiments, a performance-parameter monitor operates on the computer system it is monitoring. In other embodiments, a performance-parameter monitor operates on one or more service processors. In still other embodiments, a performance-parameter monitor operates on a separate computer system which can include black-box recorder 106. In some embodiments, a performance-parameter monitor operates on one computer system in set of computer systems 100 and monitors performance parameters for one or more computer systems in set of computer systems 100. In some embodiments, a performance-parameter monitor includes a method or apparatus for monitoring and recording computer system performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006, which is hereby fully incorporated by reference.

The monitored performance parameters can include but are not limited to one or more of the following: temperature information or other environmental variables (such as relative humidity, cumulative or differential vibrations within the computer system, electromagnetic signals, acoustic signals, current noise, voltage noise, and/or time-domain reflectometry readings), energy consumption, currents, voltages, fan speeds, performance metrics, throughput variables, transaction latencies, queue lengths, loads on one or more processors or processor cores, loads on memory, loads on a cache, I/O traffic, bus saturation metrics, FIFO overflow statistics, various operational profiles gathered through 'virtual sensors' located within an operating system in the monitored computer system, telemetry signals associated with canary performance parameters for synthetic user transactions which are periodically generated for the purpose of measuring quality of service from the end user's perspective, time series of any performance parameter, and any other parameter that is or may be related to the performance of the monitored computer system. Performance parameters can also include but are not limited to performance parameters as set forth in U.S. Pat. No. 7,020,802.

Training-data-set generator 108 can include any mechanism that receives monitored performance parameters related to two or more computer systems in set of computer systems 100 and generates a training data set in accordance with embodiments of the present invention. Training-data-set generator 108 can be implemented in any combination of hardware and software. In some embodiments, training-data-set generator 108 operates on a computer system such as a server. In other embodiments, training-data-set generator 108 operates on one or more service processors. In some embodiments, training-data-set generator 108 operates on a computer system in set of computer systems 100. In some embodiments, training-data-set generator 108 is co-located with one or more computer systems in set of computer systems 100. In some embodiments, training-data-set generator 108 is located separately from all computers in set of computer systems 100. In some embodiments training-data-set generator 108 is located at a computer system vendor's data center.

Some embodiments of the present invention operate as follows. During operation of computer systems in set of computer systems 100, performance parameters are monitored from two or more computer systems in set of computer systems 100. In some embodiments, the performance parameters are monitored by performance parameter monitors operating in the computer system being monitored, while in other embodiments the performance parameters are monitored by a performance parameter monitor operating on black-box recorder 106.

Note that the performance parameters monitored from computer systems in set of computer systems 100 may be monitored simultaneously, at different times, over different time periods, or over predetermined operation modes or time periods for one or more selected computer systems in set of computer systems 100. For example, the performance parameters monitored from computer system 102A may be monitored and stored in black-box recorder 106 for operation of computer system 102A over a predetermined time period while the performance parameters monitored from computer systems 102B and 102N are monitored over other predetermined time periods. The predetermined time periods may be selected based on any parameters desired, including but not limited to one or more of: the time of day, day of the week, load profiles on one or more computer systems in set of computer systems 100, or any other operation mode, timing, or parameters desired. Additionally, in some embodiments, performance parameter monitors operating on one or more of the computer systems in set of computer systems 100 send the monitored performance parameters to black-box recorder 106 at regular intervals or when polled by black-box recorder 106.

Training-data-set generator 108 then signals black-box recorder 106 to send performance parameters from two or more computer systems in set of computer systems 100. In some embodiments, training-data-set generator 108 determines which computer systems from set of computer systems 100 to retrieve performance parameters for, and for which time periods based on the computer system that training-data-set generator 108 is generating the training data set for. For example, training-data-set generator 108 may select monitored performance parameters from black-box recorder 106 based on one or more of the following: the type, configuration, and operation mode of the computer systems for which the performance parameters were monitored. Specifically, in some embodiments, training-data-set generator selects performance parameters monitored from computer systems in set of computer systems 100 that are the same model and configuration as the computer system the training data set is being generated for. Additionally, training-data-set generator 108 may select performance parameters monitored from computer systems that operated in different parts of a ten-day operation period, or in different operation modes that span a desired range of operation modes.

Training-data-set generator 108 then generates a training data set based on the performance parameters received from black-box recorder 106. In some embodiments, training-data-set generator 108 generates the training data set from the monitored performance parameters by concatenating the time-series of the performance parameters received from black-box recorder 106. This process is illustrated with reference to FIGS. 2 and 3 below. Note that in some embodiments, the training data set is generated from performance parameters monitored from at least two computer systems. For example, the training data set may be generated by concatenating the time-series of monitored performance parameters from 100 or more computer systems in set of computer systems 100.

Figure 2A:
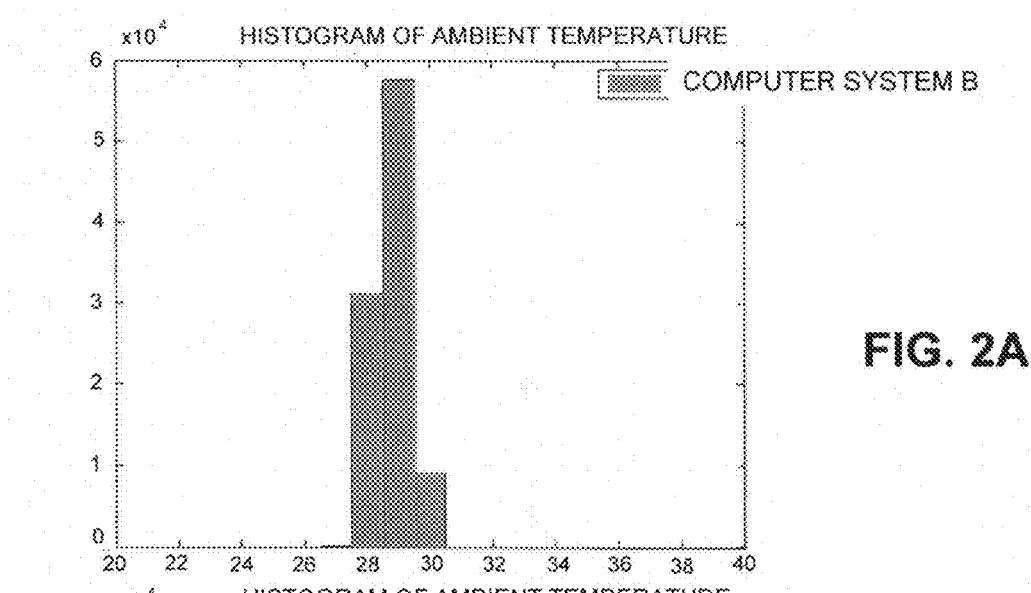
FIG. 2A presents a histogram of monitored ambient temperature measurements from a computer system in accordance with an embodiment.
Figure 2B:
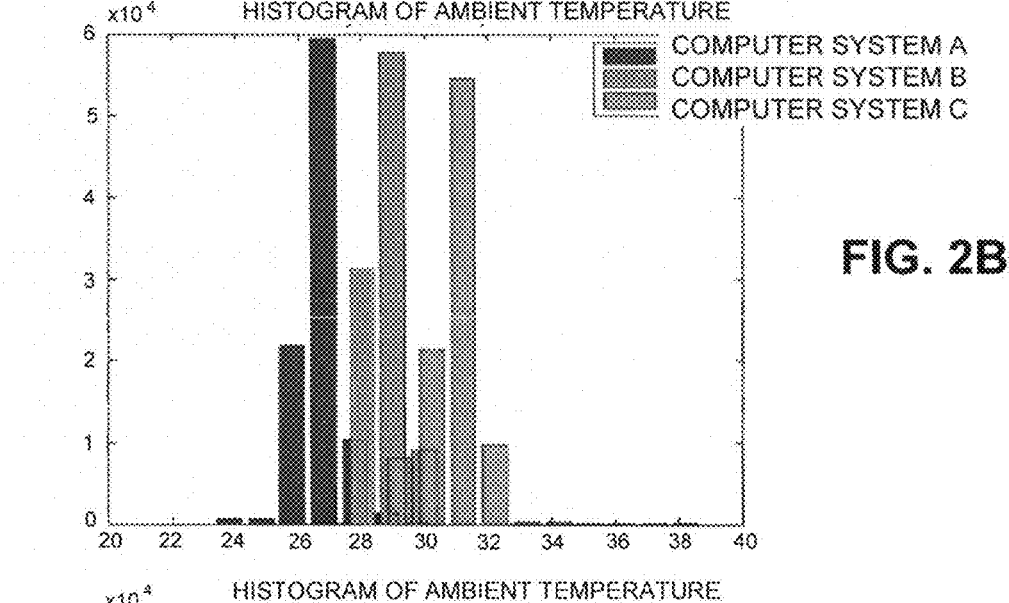
FIG. 2B presents a histogram of monitored ambient temperature measurements from three computer systems in accordance with an embodiment.
Figure 2C:
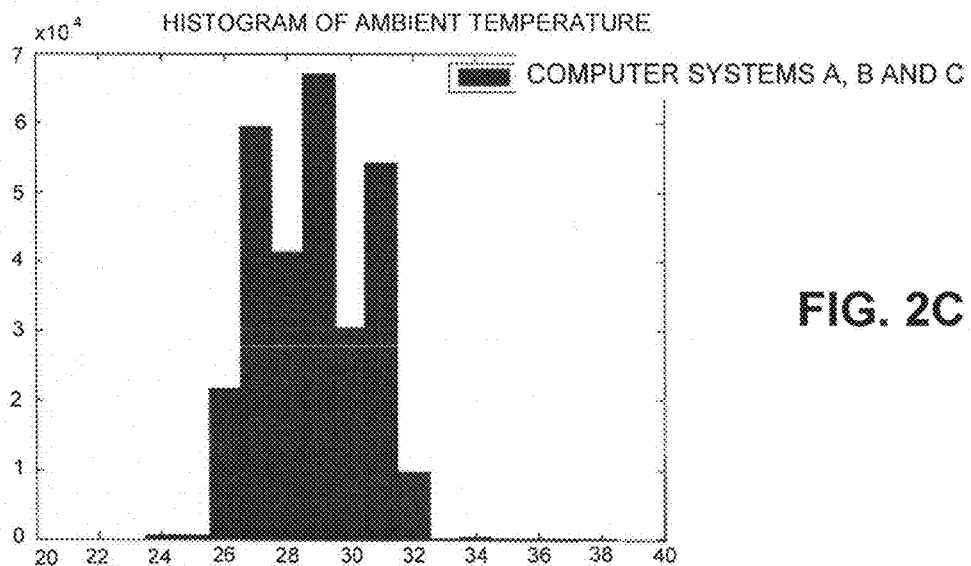
FIG. 2C presents a histogram generated by combining the monitored ambient temperature measurements from three computer systems in accordance with an embodiment.

FIG. 2A presents a histogram of a performance parameter, ambient temperature, monitored from one computer system over a predetermined time period in accordance with an embodiment. FIG. 2B presents a histogram displaying the ambient temperature monitored from three computer systems in accordance with an embodiment. Note that the histograms from each of the three computer systems, A, B, and C, overlap at some temperatures but are not identical. For example, during the normal operation of each of the computer systems, the distribution of the most commonly occurring temperatures was different for each of the three computer systems. FIG. 2C presents a histogram that combines the histograms from each of the three computer systems and represents the histogram of the training data set generated by training-data-set generator 108 using the process discussed below.

Figure 3A:
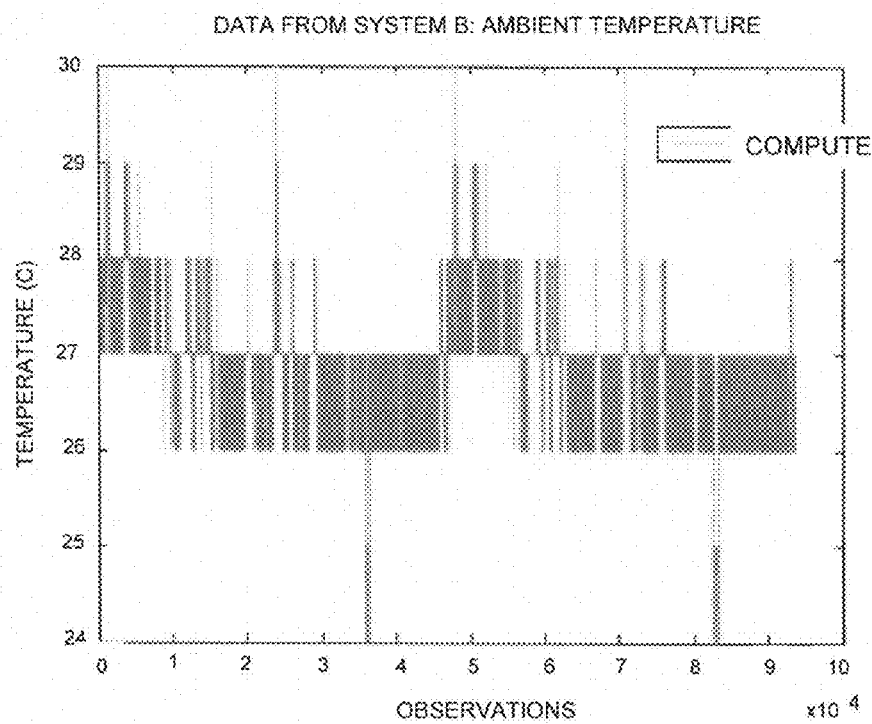
FIG. 3A presents a time-series of monitored ambient temperature measurements from a computer system in accordance with an embodiment.
Figure 3B:
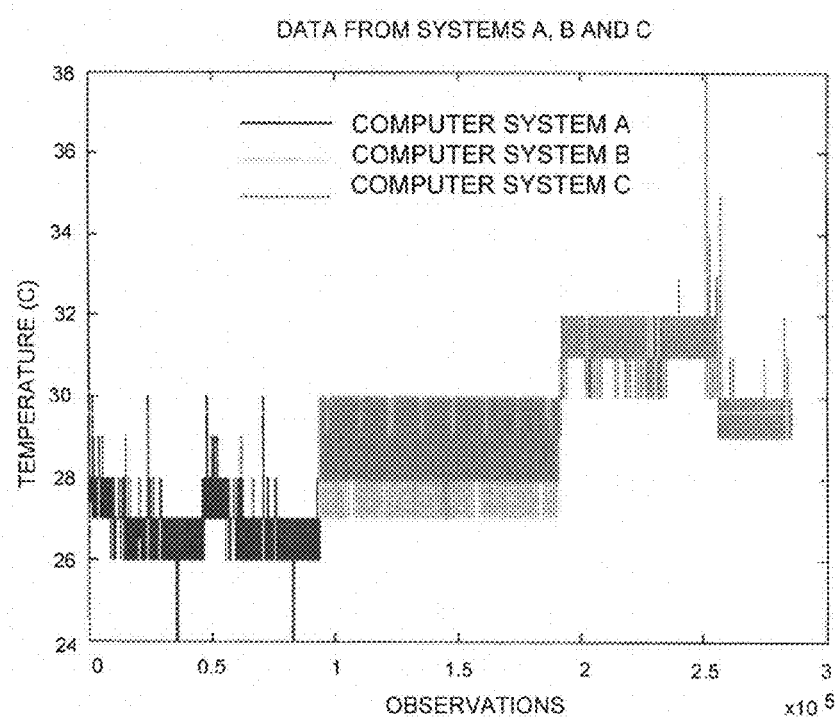
FIG. 3B presents a time-series of monitored ambient temperature measurements from three computer systems that have been concatenated in accordance with an embodiment.

FIG. 3A presents a time-series of the ambient temperature performance parameter monitored from one of the computer systems and recorded by black-box recorder 106. Note that the time-series of ambient temperature is shown over the course of almost 100,000 equally spaced observations of the ambient temperature data. Training-data-set generator 108 receives the time-series of monitored ambient temperature from each of the three computer systems and concatenates them to generate the training data set. FIG. 3B presents a graph showing the concatenation of the time-series of the monitored ambient temperatures from the three computer systems. This concatenated data forms the training data set and can be used to train a pattern-recognition model for electronic prognostication of a computer system. Note that the time-series of monitored ambient temperatures from the three computer systems may be concatenated in any order. Additionally in some embodiments, portions of the time-series from each computer system may be concatenated in any order to generate the training data set. For example, the time-series of the monitored ambient temperatures from each computer system may be separated into multiple parts and the parts may be concatenated in any order to generate the training data set.

Figure 4:
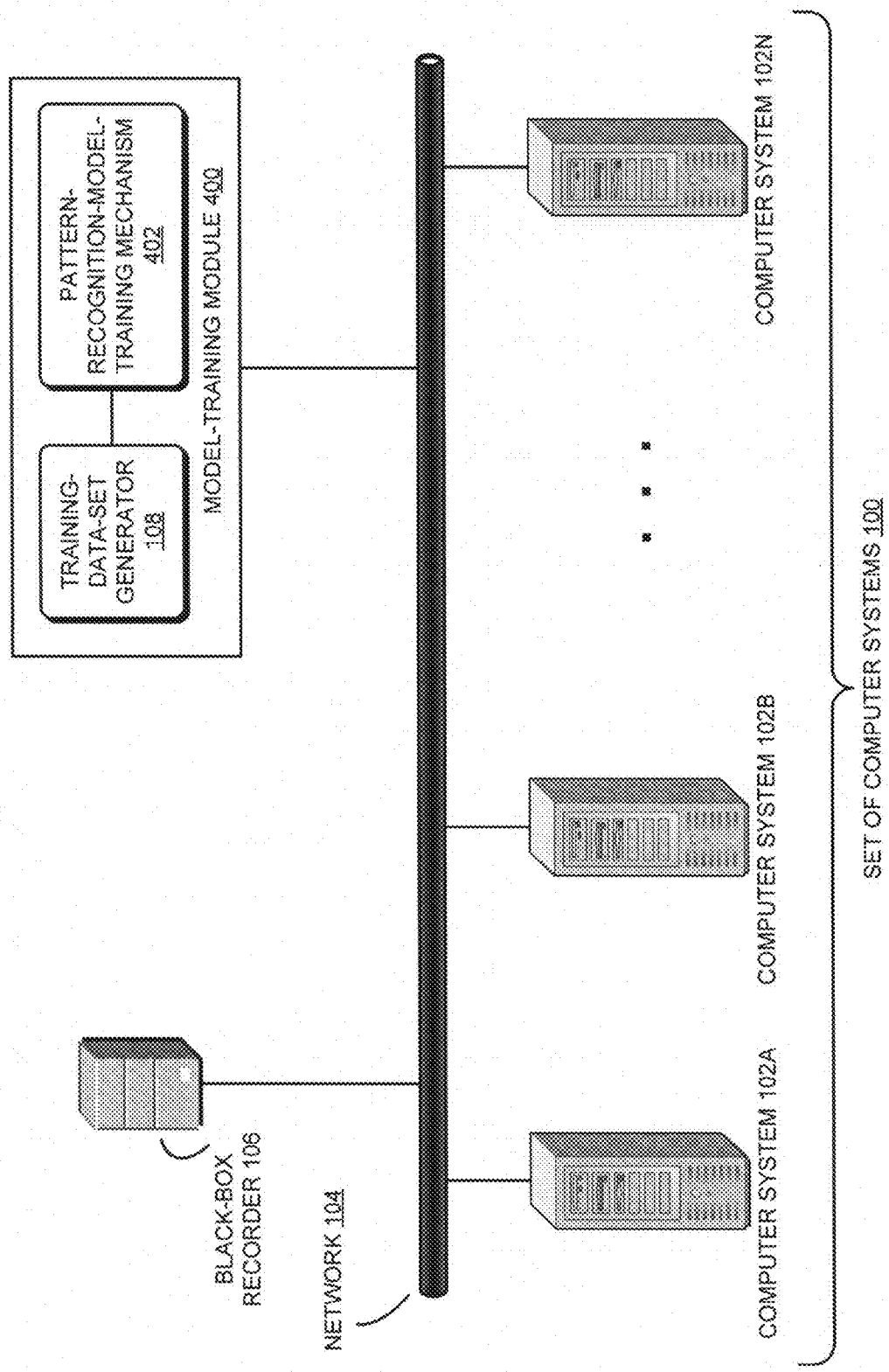
FIG. 4 illustrates a system that trains a pattern-recognition model for electronic prognostication for a computer system in accordance with an embodiment.

FIG. 4 illustrates a system that trains a pattern-recognition model for electronic prognostication for a computer system in accordance with an embodiment. FIG. 4 includes set of computer systems 100, with three computer systems (computer system 102A, computer system 102B, and computer system 102N) depicted. Additionally, computer systems in set of computer systems 100 are connected to network 104 along with black-box recorder 106 and model-training module 400. Note that model-training module 400 includes training-data-set generator 108 and pattern-recognition-model-training mechanism 402.

Pattern-recognition-model-training mechanism 402 can include any mechanism that can train a pattern-recognition model using the training data set generated by training-data-set generator 108 in accordance with embodiments of the present invention. Pattern-recognition-model-training mechanism 402 can be implemented in any combination of hardware and software. In some embodiments, pattern-recognition-model-training mechanism 402 operates on a computer system such as a server. In other embodiments, pattern-recognition-model-training mechanism 402 operates on one or more service processors. In some embodiments, pattern-recognition-model-training mechanism 402 operates on a computer system in set of computer systems 100. In some embodiments, pattern-recognition-model-training mechanism 402 is co-located with one or more computer systems in set of computer systems 100. In some embodiments, pattern-recognition-model-training mechanism 402 is located separately from all computers in set of computer systems 100. In some embodiments, pattern-recognition-model-training mechanism 402 and training-data-set generator 108 operate on the same computer system. In some embodiments, pattern-recognition-model-training mechanism 402 is located at a computer system vendor's data center.

Some embodiments operate as follows. Training-data-set generator 108 operates as described above. The training data set generated by training-data-set generator 108 is communicated to pattern-recognition-model-training mechanism 402. Pattern-recognition-model-training mechanism 402 then uses the training data set to train a pattern-recognition model for use in electronic prognostication of a computer system. Note that the computer system the pattern-recognition model is trained to be used with may be a computer system in set of computer systems 100, and may be one of the computer systems used to generate the training data set. Furthermore, note that the pattern-recognition model trained by pattern-recognition-model-training mechanism 402 can include but is not limited to a nonlinear, nonparametric regression model and can include the use of a multivariate state estimation technique (MSET).

The term "MSET" as used in this specification refers to a class of pattern-recognition algorithms. For example, see [Gribok] " Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies,* Washington, D.C., Nov. 13-17, 2000. This paper outlines several different pattern-recognition approaches. Hence, the term "MSET" as used in this specification can refer to (among other things) any technique outlined in [Gribok], including ordinary least squares (OLS), support vector machines (SVM), artificial neural networks (ANNs), MSET, or regularized MSET (RMSET).

Note that the pattern-recognition model can be built for any type of electronic prognostication for a computer system including but not limited to one or more of the purposes described in: U.S. patent application entitled "Computer System with Integrated Electromagnetic-Interference Detectors," by Steven F. Zwinger, Kenny C. Gross, and Aleksey M. Urmanov, Ser. No. 12/132,878 filed on 4 Jun. 2008, which is hereby fully incorporated by reference; U.S. patent application entitled "Characterizing a Computer System Using Radiating Electromagnetic Signals Monitored by an Interface," by Andrew J. Lewis, Kenny C. Gross, Aleksey M. Urmanov, and Ramakrishna C. Dhanekula, Ser. No. 12/177,724 filed on 22 Jul. 2008, which is hereby fully incorporated by reference; U.S. patent application entitled "Generating a Utilization Charge for a Computer System," by Kalyanaraman Vaidyanathan, Steven F. Zwinger, Kenny C. Gross and Aleksey M. Urmanov, Ser. No. 12/269,575 filed on 12 Nov. 2008, which is hereby fully incorporated by reference; and U.S. patent application entitled "Estimating Relative Humidity Inside a Computer System," by Leoncio D. Lopez, Kenny C. Gross, and Kalyanaraman Vaidyanathan, Ser. No. 12/114,363 filed on 2 May 2008, which is hereby fully incorporated by reference.

Figure 5A:
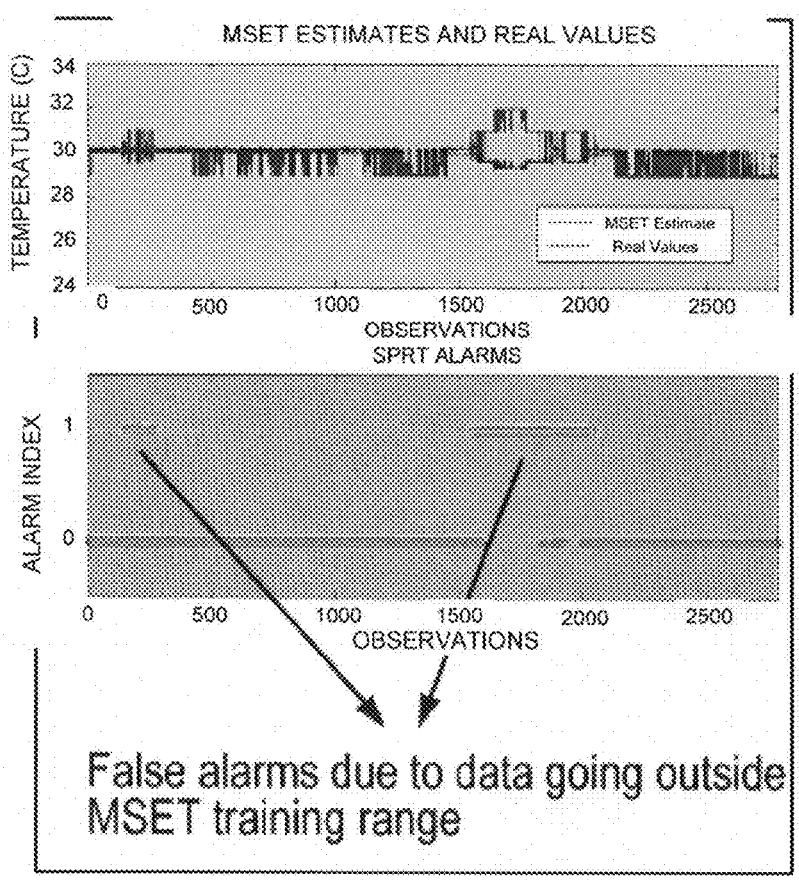
FIG. 5A presents experimental results from electronic prognostication of a computer system in which temperature estimates are generated using an MSET model trained based on a training data set generated from temperature data monitored from only one computer system, and the SPRT alarms generated based on the MSET estimates in accordance with an embodiment.

FIG. 5A presents experimental results from electronic prognostication of a computer system in which temperature estimates are generated using an MSET model trained based on a training data set generated from temperature data monitored from only one computer system in accordance with an embodiment. Additionally, FIG. 5A presents sequential probability ratio test (SPRT) alarms generated based on the MSET estimates in accordance with an embodiment. Note that the computer system being monitored in FIG. 5A is functioning normally and no alarms should be generated. The MSET model used to generate the estimates of the ambient temperature of the computer system in FIG. 5A was trained using the performance parameter time-series data from only one computer system as depicted in FIG. 3A. The time-series of the performance parameter monitored from only computer system B (as depicted in the time-series of FIG. 3A and the histogram of ambient temperatures in FIG. 2A) does not represent the full operating ambient temperature range of the monitored computer system in FIG. 5A. The SPRT generates false alarms as the ambient temperature monitored from the computer system goes outside the range of the training data monitored from computer system B, for example, at observation points in the range from just above observation point 1500 to approximately observation point 2000 in FIG. 5A.

Figure 5B:
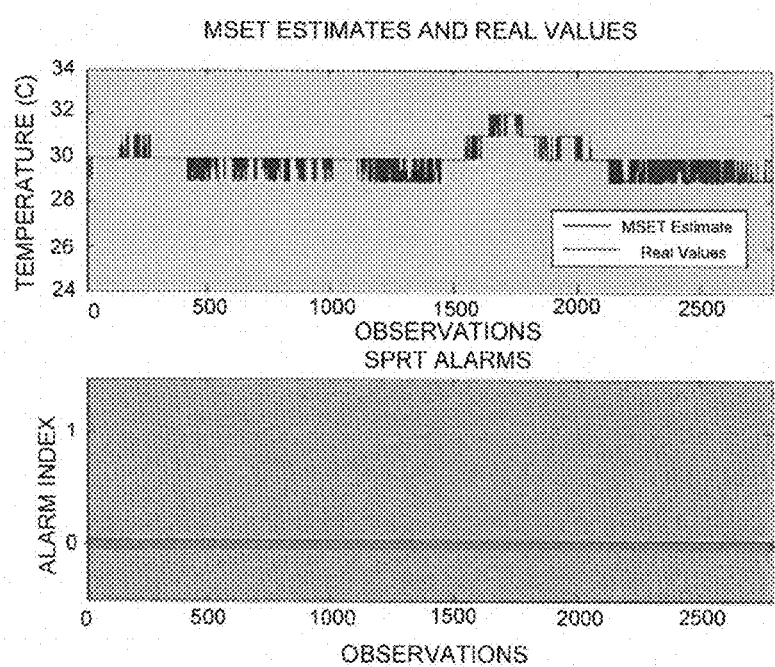
FIG. 5B presents experimental results from electronic prognostication of a computer system in which temperature estimates are generated using an MSET model trained based on a training data set generated from temperature data monitored from three computer systems, and the SPRT alarms generated based on the MSET estimates in accordance with an embodiment.

FIG. 5B presents experimental results from electronic prognostication of a computer system in which temperature estimates are generated using an MSET model trained based on a training data set generated from temperature data monitored from three computer systems in accordance with an embodiment. Additionally, FIG. 5B presents SPRT alarms generated based on the MSET estimates in accordance with an embodiment. The computer system being monitored in FIG. 5B is functioning normally and no alarms should be generated. The MSET model used to generate the estimates of the ambient temperature of the computer system in FIG. 5B was trained using the performance parameter time-series data from three computer system as depicted in FIG. 3B. The time-series of the performance parameter monitored from the three computer systems A, B, and C (as depicted in the time-series of FIG. 3B and the histogram of FIG. 2C) includes the full operating range of the monitored computer system in FIG. 5A, and no false SPRT alarms are generated, as the ambient temperature monitored from the computer system does not go outside the range of the training data.

Figure 6A:
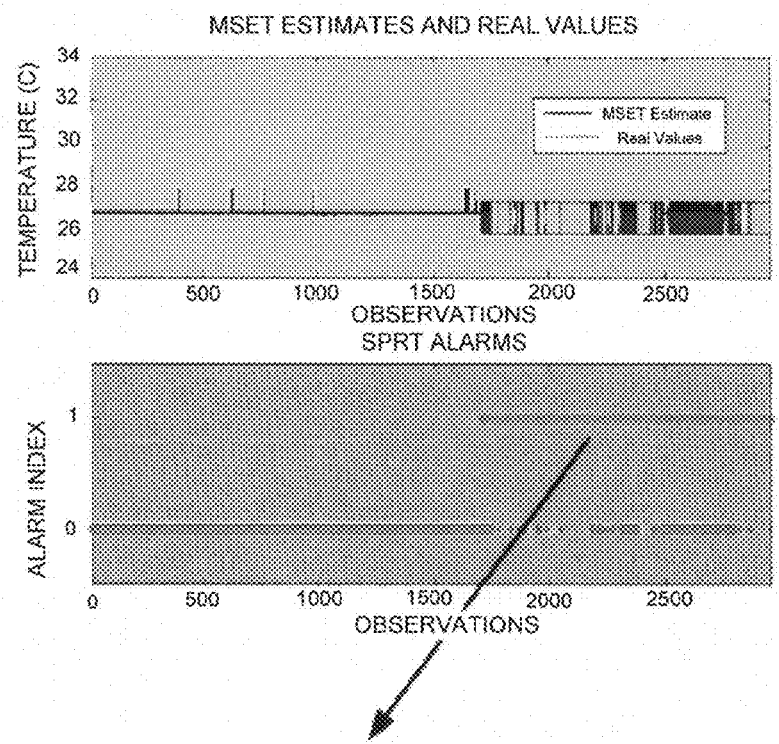
FIG. 6A presents another set of experimental results from electronic prognostication of a computer system in which temperature estimates are generated using an MSET model trained based on a training data set generated from temperature data monitored from only one computer system, and the SPRT alarms generated based on the MSET estimates in accordance with an embodiment.

FIG. 6A presents another set of experimental results from electronic prognostication of a computer system in which temperature estimates are generated using an MSET model trained based on a training data set generated from temperature data monitored from only one computer system in accordance with an embodiment. Additionally, FIG. 6A presents SPRT alarms generated based on the MSET estimates in accordance with an embodiment. Note that as in FIG. 5A, when the pattern-recognition model is trained with data from only one computer system and the normal operation range of the monitored computer system goes outside the data from the one system, then false alarms are generated by the electronic prognostication system.

Figure 6B:
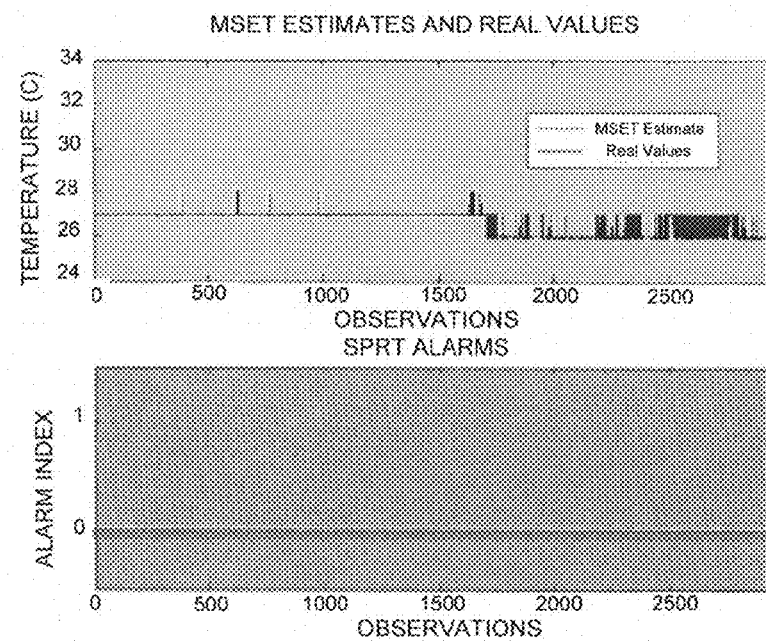
FIG. 6B presents experimental results from electronic prognostication of a computer system in which temperature estimates are generated using an MSET model trained based on a training data set generated from temperature data monitored from three computer systems, and the SPRT alarms generated based on the MSET estimates in accordance with an embodiment.

FIG. 6B presents experimental results from electronic prognostication of a computer system in which temperature estimates are generated using an MSET model trained based on a training data set generated from temperature data monitored from three computer systems in accordance with an embodiment. Additionally, FIG. 6B presents SPRT alarms generated based on the MSET estimates in accordance with an embodiment. Note that no false alarms are generated when the pattern-recognition model is trained with performance parameter data from the three computer systems since the operating range of the three computer systems includes the normal operating range of the monitored computer system.

Figure 7:
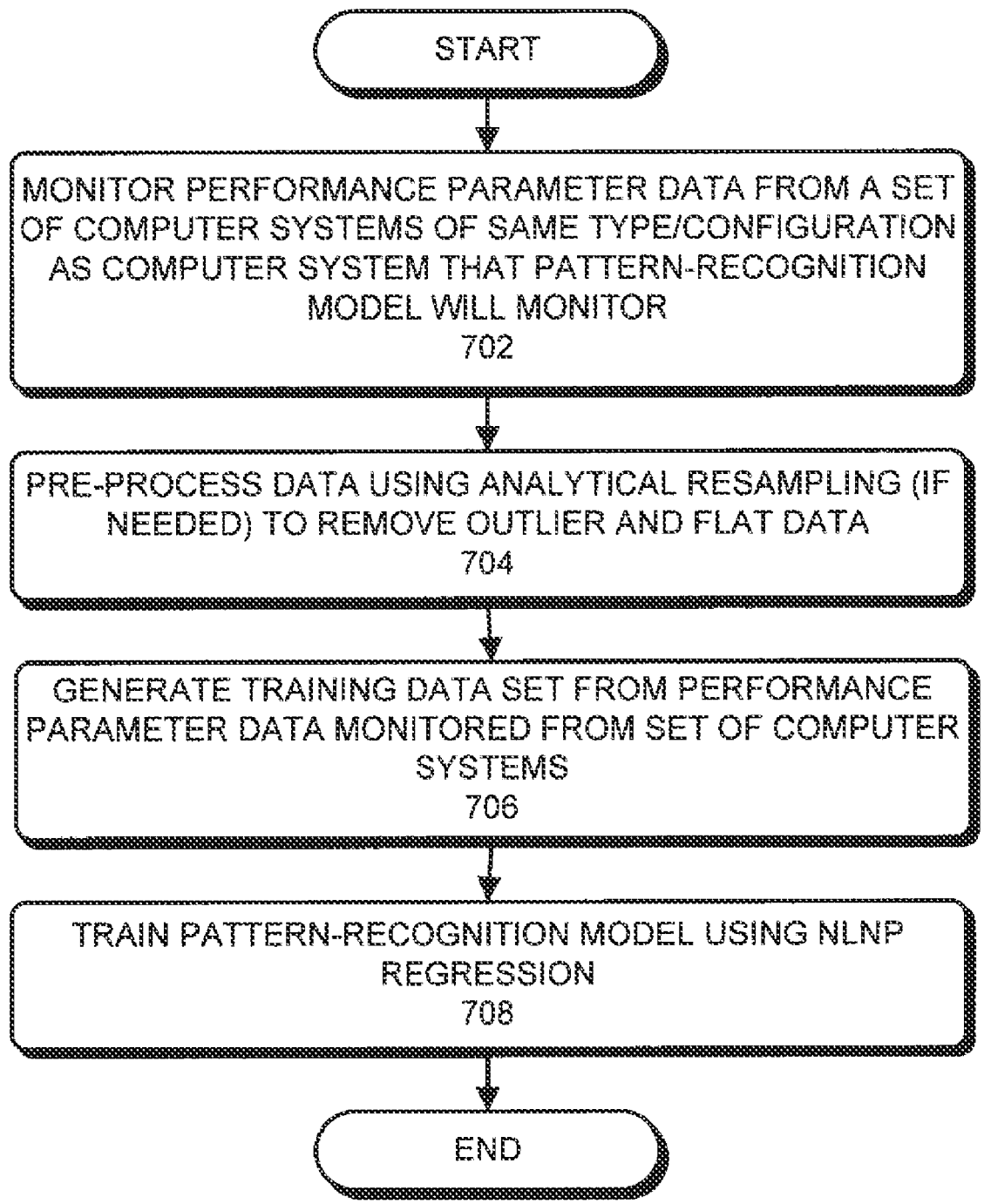
FIG. 7 presents a flowchart illustrating the process for training a pattern-recognition model for electronic prognostication for a computer system in accordance with an embodiment.

FIG. 7 presents a flowchart illustrating the process for training a pattern-recognition model for electronic prognostication for a computer system in accordance with an embodiment. First, the system monitors performance parameter data from a set of computer systems of the same type and configuration as the computer system that is going to be monitored by the pattern-recognition model to be trained (step 702). The performance parameter data is pre-processed using analytical resampling, if necessary (step 704). The analytical resampling may remove outlier and flat data, and resample the data so that there is a uniform sampling rate through the entire data set. Note that many pattern-recognition models, including those using MSET, may require uniformly sampled data. The system then generates a training data set from the performance parameter data monitored from the set of computer systems (step 706). In some embodiments, the training data set is generated from the monitored performance parameter data by concatenating time-series of monitored performance parameter data as discussed above. Note that the order of execution of step 704 and step 706 can be reversed in some embodiments. Then, the system uses the training data set to train a pattern-recognition model for electronic prognostication of a computer system (step 708).

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for electronic prognostication for a computer system, the method comprising:
monitoring a performance parameter in a set of performance parameters from a set of computer systems that includes at least two computer systems, wherein monitoring the performance parameter includes systematically monitoring and recording the set of performance parameters from computer systems in the set of computer systems, and wherein the recording process keeps track of the temporal relationships between events in different performance parameters in the set of performance parameters;
generating a training data set based on the performance parameter monitored from the set of computer systems, wherein generating the training data set includes concatenating two or more time-series of the performance parameter by appending each time-series from the two or more time-series to an end of a previous time-series from the two or more time-series, wherein each of the two or more time-series is obtained from a different computer system in the set of computer systems;
training the pattern-recognition model using the training data set;
using the pattern-recognition model to look for anomalies in performance parameters gathered during normal operation of a target computer system; and
generating an alarm when the pattern-recognition model detects an anomaly in the performance parameters from the target computer system.

2. The method of claim 1, wherein monitoring the performance parameter from the set of computer systems includes storing the monitored performance parameter in a black-box recorder.

3. The method of claim 1, wherein generating the training data set includes analytically resampling the performance parameter monitored from computer systems in the set of computer systems.

4. The method of claim 1, wherein using the pattern-recognition model to look for anomalies in performance parameters includes using a sequential probability ratio test (SPRT).

5. The method of claim 1, wherein the pattern-recognition model includes a nonlinear, nonparametric regression model.

6. The method of claim 1, wherein the pattern-recognition model uses a multivariate state estimation technique (MSET).

7. The method of claim 1, wherein the computer system that the pattern-recognition model provides electronic prognostication for is in the set of computer systems.

8. The method of claim 1, wherein the set of computer systems includes at least one hundred computer systems.

9. The method of claim 1, wherein monitoring the performance parameter from a first computer system in the set of computer systems occurs prior to monitoring the performance parameter from a second computer system in the set of computer systems.

10. The method of claim 1, wherein appending each time-series to the end of the previous time-series comprises:
splitting each of the two or more time-series into one or more parts; and
combining the parts by appending each part to an end of another part until all the parts have been combined.

11. A non-transitory computer-readable storage medium storing instructions that when executed by a computer cause the computer to perform a method for training a pattern-recognition model for electronic prognostication for a computer system, the method comprising:
monitoring a performance parameter in a set of performance parameters from a set of computer systems that includes at least two computer systems, wherein monitoring the performance parameter includes systematically monitoring and recording the set of performance parameters from computer systems in the set of computer systems, and wherein the recording process keeps track of the temporal relationships between events in different performance parameters in the set of performance parameters;

generating a training data set based on the performance parameter monitored from the set of computer systems, wherein generating the training data set includes concatenating two or more time-series of the performance parameter by appending each time-series from the two or more time-series to an end of a previous time-series from the two or more time-series, wherein each of the two or more time-series is obtained from a different computer system in the set of computer systems;

training the pattern-recognition model using the training data set; and using the pattern-recognition model to look for anomalies in performance parameters gathered during normal operation of a target computer system; and generating an alarm when the pattern-recognition model detects an anomaly in the performance parameters from the target computer system.

12. The non-transitory computer-readable storage medium of claim 11, wherein monitoring the performance parameter from the set of computer systems includes storing the monitored performance parameter in a black-box recorder.

13. The non-transitory computer-readable storage medium of claim 11, wherein using the pattern-recognition model to look for anomalies in performance parameters includes using a sequential probability ratio test (SPRT).

14. The non-transitory computer-readable storage medium of claim 11, wherein the pattern-recognition model includes a nonlinear, nonparametric regression model.

15. The non-transitory computer-readable storage medium of claim 11, wherein the pattern-recognition model uses a multivariate state estimation technique (MSET).

16. The non-transitory computer-readable storage medium of claim 11, wherein the computer system that the pattern-recognition model provides electronic prognostication for is in the set of computer systems.

17. The non-transitory computer-readable storage medium of claim 11, wherein the set of computer systems includes at least one hundred computer systems.

18. An apparatus for electronic prognostication for a computer system, the apparatus comprising:

a monitoring mechanism configured to monitor a performance parameter in a set of performance parameters from a set of computer systems, wherein the set of computer systems includes at least two computer systems, and wherein the monitoring mechanism is further configured to systematically monitor and record performance parameters in the set of performance parameters from computer systems in the set of computer systems and wherein the monitoring mechanism is further configured to keep track of the temporal relationships between events in different performance parameters in the set of performance parameters; and a generating mechanism configured to generate a training data set based on the performance parameter monitored from the set of computer systems, wherein the generating mechanism is configured to concatenate two or more time-series of the performance parameter by appending each time-series from the two or more time-series to an end of a previous time-series from the two or more time-series, wherein each of the two or more time-series is obtained from a different computer system in the set of computer systems;

a training mechanism configured to train the pattern-recognition model using the training data set;

a surveillance mechanism configured to use the pattern-recognition model to look for anomalies in performance parameters gathered during operation of a monitored computer system; and an alarm-generation mechanism configured to generate an alarm when the pattern-recognition model detects an anomaly in the performance parameters from the monitored computer system.

19. The apparatus of claim 18, wherein the monitoring mechanism includes a black-box recorder mechanism.

20. The apparatus of claim 18, wherein the generating mechanism includes a mechanism that analytically resamples the performance parameter.

\* \* \* \* \*